United States Patent
Schroeder

(10) Patent No.: US 10,040,644 B2
(45) Date of Patent: Aug. 7, 2018

(54) EMPTIES TRANSPORT SYSTEM AND EMPTIES RETURN SYSTEM FOR SUCTION OF CONTAINERS

(71) Applicant: Wincor Nixdorf International GmbH, Paderborn (DE)

(72) Inventor: Berthold Schroeder, Ilmenau (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 15/596,612

(22) Filed: May 16, 2017

(65) Prior Publication Data
US 2017/0334666 A1    Nov. 23, 2017

(30) Foreign Application Priority Data

May 17, 2016  (DE) .................. 10 2016 109 012

(51) Int. Cl.
*B65G 51/00*    (2006.01)
*B65G 53/46*    (2006.01)

(52) U.S. Cl.
CPC ......... *B65G 51/00* (2013.01); *B65G 53/4691* (2013.01)

(58) Field of Classification Search
CPC ............................................... B65G 53/4691
USPC ....... 406/124, 125, 126, 144, 147, 148, 149, 406/150
See application file for complete search history.

(56) References Cited

U.S. PATENT DOCUMENTS

| | | | |
|---|---|---|---|
| 4,245,731 A | | 1/1981 | Herbst et al. |
| 4,275,976 A | * | 6/1981 | Sticht .................. B65G 51/38 |
| | | | 406/148 |
| 4,440,284 A | * | 4/1984 | DeWoolfson ......... G07F 7/0609 |
| | | | 194/212 |
| 4,466,761 A | * | 8/1984 | Beltrop ................. B65G 51/34 |
| | | | 406/112 |
| 5,441,160 A | | 8/1995 | DeWoolfson et al. |
| 5,490,745 A | * | 2/1996 | Thiele ................... B65G 53/46 |
| | | | 251/147 |
| 5,704,558 A | | 1/1998 | Arrott |

(Continued)

FOREIGN PATENT DOCUMENTS

EP    0082735       6/1983
EP    0 633 205 A1  1/1995

OTHER PUBLICATIONS

European Search Report, dated Nov. 2, 2017, for corresponding European Application No. 17171280.5.

*Primary Examiner* — Joseph Dillon, Jr.
(74) *Attorney, Agent, or Firm* — Black, McCuskey, Souers & Arbaugh, LPA

(57) ABSTRACT

An empties transport system has an airstream transport device with an empties transport conduit, which has a first attachment point for attachment to the reverse vending machine and a second attachment point for attachment to the empties collection container, and an airstream generator, which is attached to the empties transport conduit and is designed to make available, in the empties transport conduit, a transporting airstream by means of which the empties passing via the first attachment point from the reverse vending machine the empties transport conduit are moved to the empties collection container, and an airlock device which is arranged on the first attachment point and via which the empties are transferable from the reverse vending machine to the empties transport conduit.

11 Claims, 3 Drawing Sheets

(56) References Cited

U.S. PATENT DOCUMENTS

| | | | | |
|---|---|---|---|---|
| 5,888,027 | A * | 3/1999 | Buer | B03B 9/061 |
| | | | | 209/215 |
| 6,283,680 | B1 * | 9/2001 | Vidal | B65G 53/32 |
| | | | | 222/207 |
| 6,712,561 | B1 * | 3/2004 | Valerino, Sr. | B09B 3/0075 |
| | | | | 406/117 |
| 7,751,930 | B2 * | 7/2010 | Valerino, Sr. | B65G 51/06 |
| | | | | 406/2 |
| 8,113,745 | B2 * | 2/2012 | Aoki | B65G 53/525 |
| | | | | 406/126 |
| 8,747,029 | B2 * | 6/2014 | Thorn | B65G 53/66 |
| | | | | 406/127 |
| 8,905,681 | B2 * | 12/2014 | Schneider | B65G 53/06 |
| | | | | 209/139.1 |
| 2011/0150580 | A1 * | 6/2011 | Terzini | B65G 51/20 |
| | | | | 406/83 |
| 2012/0195698 | A1 * | 8/2012 | Soerensen | B65G 51/02 |
| | | | | 406/34 |
| 2015/0025675 | A1 * | 1/2015 | Valerino, Sr. | B65G 51/04 |
| | | | | 700/226 |

\* cited by examiner

EMPTIES TRANSPORT SYSTEM AND EMPTIES RETURN SYSTEM FOR SUCTION OF CONTAINERS

CROSS-REFERENCE TO RELATED APPLICATIONS

This Application claims priority to and the benefit of German Patent Application No. DE 10 2016 109 012.3 filed May 17, 2016, the contents of which are hereby incorporated by reference in their entirety.

BACKGROUND

This relates to an empties transport system and an empties return system for returning empties and for automatic transport of empties from a reverse vending machine to an empties collection container.

Empties, which are present in the form of containers for example, such as returnable bottles, e.g. plastic bottles such as PET (polyethylene terephthalate) bottles, and cans, for example aluminum cans, for beverages, are generally returned by consumers by reverse vending machines, which are set up in supermarkets for example. Conventional reverse vending machines collect the returned empties, e.g. in bags, which are then manually exchanged for new, empty bags by employees at the reverse vending facility and then brought to an empties collection container for transportation. However, exchanging the bags of the reverse vending machines and bringing them to the empties collection container is time-consuming and, on account of the free form of the bags, leads to poor utilization of space in the empties collection container. Moreover, the reverse vending machines are not available to the consumers while the bags are being exchanged. Additionally, the bags filled with the empties are also heavy and awkward to transport, they are usually carried by one person over a not inconsiderable distance (up to several hundred meters away in some supermarkets), which is disadvantageous in terms of work ergonomics.

SUMMARY

An empties transport system and an empties return system are provided, which allow the return and automatic transport of empties, which are present in the above-described form for example, from a reverse vending machine to an empties collection container, e.g. with at the same time efficient utilization of the space in the empties collection container.

An empties transport system and an empties return system are provided. Further embodiments of the empties transport system and of the empties return system are described.

An empties transport system according to an illustrative embodiment can be used for the automatic transport of empties from a reverse vending machine to an empties collection container (e.g. a transport container or recycling container), wherein the empties can be individual and at least substantially completely emptied beverage containers (e.g. a returnable bottle, for example a PET bottle, or a beverage can, for example made of aluminum or tinplate), a plurality of beverage containers, or individual components of one or more beverage containers (e.g. shredded empties). That is to say, for transport in the empties transport system, the empties can be present in unmodified form, i.e. in their original form, compressed (e.g. pressed) or compacted (e.g. pressed repeatedly in different spatial directions). The reverse vending machine can be set up in a reverse vending facility, for example in a supermarket or in a beverage shop, such that consumers can introduce empties manually into the machine. The empties are transported by the empties transport system to the remote (e.g. several meters to a hundred meters or several hundred meters) empties collection container and collected there pending onward shipment to a recycling plant.

The empties transport system can have an empties transport conduit, which has (at least) a first attachment point for attachment to the reverse vending machine and (at least) a second attachment point for attachment to the empties collection container, wherein the empties transport conduit can have, for example, a round cross section, e.g. an at least substantially circular cross section, with a diameter in a range, for example, of approximately 5 cm to approximately 50 cm, for example in a range of approximately 10 cm to approximately 30 cm, for example in a range of approximately 15 cm to approximately 25 cm (for example, the empties transport conduit can also have different diameters, e.g. in a case where several empties transport conduits are run together). The cross-sectional diameter is to be chosen, for example, depending on the length of the empties transport conduit, wherein the following applies: the longer the empties transport conduit, the smaller the cross-sectional diameter that should be chosen.

Moreover, the empties transport system can have an airstream generator (e.g. a fan, e.g. for reasons of redundancy also two or more fans, for example in the form of a radial ventilator), which is attached to the empties transport conduit and is designed to make available, in the empties transport conduit, a transporting airstream by which the empties passing via the first attachment point from the reverse vending machine into the empties transport conduit are movable to the empties collection container. The airstream generator can be provided, for example, near the first attachment point in order to generate an overpressure there in the empties transport conduit, and/or it can be provided near the second attachment point in order to generate an underpressure there in the empties transport conduit, for example. Optionally, the airstream generator and the empties transport conduit can be designed in such a way that an underpressure in relation to the environment is present at least in the area of the first attachment point(s). The underpressure can, for example, be applied at the attachment point by the Bernoulli effect, and/or in such a way that an underpressure per se is present in the empties transport conduit.

The empties transport system can moreover have an airlock device, which is arranged on the first attachment point in order to be attachable between the reverse vending machine and the empties transport conduit (e.g. directly or by intermediate elements, e.g. compression devices for empties, compaction devices for empties, conveyor belts, ascending conveyors, etc.), and via which the empties are transferable from the reverse vending machine to the empties transport conduit, and which has at least one airlock gate (e.g. an electrically or electro-pneumatically actuated flap or an electrically actuated slide) for the automatically controlled, selective separation of the empties transport conduit from the reverse vending machine attached thereto. Insofar as the airlock device is arranged in or directly on the reverse vending machine, this prevents unwanted items (for example from the area in front of the reverse vending machine) from being sucked in. Likewise, the airlock device reduces the fan power needed to transport the empties, i.e. the transporting airstream of the airstream generator, by minimizing airstream leakage losses at the first attachment point (e.g., leakage losses in the empties transport conduit are detected via a pressure difference between an actual pressure value and a desired pressure value in the empties transport conduit).

The empties transport system can also have an automatic control device, which is connected (at least) to the airlock device in order to automatically control an opening and closing actuation of the at least one airlock gate as a function of the empties, which are to be carried away via the empties transport conduit, and which are delivered to the airlock device from the reverse vending machine. The automatic control of the airlock device can be effected, for example on the basis of the empties detected in the reverse vending machine (e.g. bottle or can), of an operating state of the airstream generator, of empties currently transported in the empties transport conduit (the position of the empties being able to be determined for example via differential pressure measurements at different locations of the conduit), etc., by sensors of the empties transport system. Moreover, for example, the airlock gate can also be briefly opened selectively for sucking out/blowing out odors from the reverse vending machine, e.g. odors caused by residual liquid, without empties being transported away.

The airstream generator can be designed in such a way that, during the operation of the empties transport system, it makes the transporting airstream permanently available.

The airlock device can have a second airlock gate, wherein the control device is designed to control the opening and closing actuation of the first and the second airlock gate of the airlock device in such a way that at least substantially only one of the first and the second airlock gates is opened, i.e. at least one of the airlock gates is always closed. However, it may also be the case, for example, that the first and the second airlock gate are at least partially open simultaneously for a predetermined period, such that an air exchange (smaller in relation to the transporting airstream) takes place between the reverse vending machine and the empties transport conduit, in order to suck out/blow out odors (in order to prevent odors, the airlock device and/or the empties transport conduit, for example, can be cleaned by an atomized spray, e.g. of finely dispersed cleaner and/or water, which is introduced into the transporting airstream).

The airlock device and/or the first attachment point can be designed in such a way that the transfer of the empties from the airlock device to the empties transport conduit is effected at least substantially exclusively by an airflow underpressure, which is generated in the empties transport conduit and acts on the empties present in the airlock device, and by which the empties can be sucked from the airlock device into the empties transport conduit.

An empties transport system in combination with empties according to an illustrative embodiment can have the above-described empties transport system with a conduit diameter, which is greater than the greatest dimension of the empties, such that the empties in the empties transport conduit are freely movable at least substantially in all directions (e.g. in translation and in rotation). In this way, it is possible to prevent blockages in the empties transport conduit that are caused by empties that have become jammed or wedged therein, for example at curved sections. By contrast, however, it is also possible, for example, to choose the conduit diameter such that the empties are transported through the empties transport conduit with a preferential orientation (e.g., in the case of PET bottles, with the bottom facing forward, or with the closure facing forward) and, in doing so, can only move slightly transversely with respect to the transport direction and maintain the preferential orientation at least substantially, e.g. in the manner of a pneumatic dispatch system. That is to say, the empties transport conduit can, for example, be suitable for the transport of (open) bottles, compressed bottles (e.g. bottles that are pressed together) and/or compacted bottles (e.g. bottles that are pressed in several spatial directions).

An empties return system according to an illustrative embodiment can have: the above-described empties transport system, the reverse vending machine, which is connected to the empties transport conduit via the airlock device and the first attachment point, and the empties collection container, which is connected to the empties transport conduit via the second attachment point, wherein the reverse vending machine has an empties admission opening (e.g. on the front face thereof) through which empties (e.g. individual returnable bottles and/or cans) can be introduced into the reverse vending machine (e.g. introduced manually one after another by a consumer).

In the empties return system, the airlock device can be arranged at a distance from the empties admission opening (e.g. the airlock device can be arranged in a rear and/or lower area of the reverse vending machine or as a separate device outside of the reverse vending machine, e.g. behind/below the reverse vending machine), and the reverse vending machine can have a conveyor device (e.g. a chute), optionally a mechanical conveyor device (e.g. a conveyor belt), which is arranged between the empties admission opening and the airlock device, and by which the empties introduced into the reverse vending machine through the empties admission opening can be conveyed automatically to the airlock device (e.g. controlled by the automatic control device). It is likewise possible that several reverse vending machines are attached jointly to an individual airlock device. This can be done, for example, by several reverse vending machines or associated empties compacters being connected to the airlock device by a common conveyor belt, in such a way that the empties can be discharged from the reverse vending machines or the empties compacters onto the conveyor belt and can be transported by the latter to the one individual airlock device.

Moreover, in the empties return system, the airlock device can be arranged adjacent to the empties admission opening (e.g. behind and/or below the empties admission opening), such that empties can be introduced through the empties admission opening directly into the airlock device (e.g. falling or sliding into the latter), in order then to be sucked into the empties transport conduit by the airflow underpressure. That is to say, the conveyor device of the reverse vending machine can be omitted, and the reverse vending machine can be made simpler and take up less space.

Moreover, the empties return system can have several reverse vending machines, e.g. two, three, four, five, six, seven, eight or more reverse vending machines (e.g. machines of the same kind or, for example, machines different from one another, of which each can accept a certain type of empty container, for example bottle or cans), which are connected to the empties transport conduit by a respective first attachment point and airlock device. For example, it is also possible that several reverse vending machines use a first attachment point and an airlock device jointly. Moreover, the empties transport system of the empties return system can also be designed with redundancy, e.g. as two separate empties transport systems, that is to say, for example, two independent empties transport systems can be connected to one (or more) reverse vending machines.

In addition, the empties return system can have an empties compacter by which the empties delivered to the reverse vending machine are compacted, by compression (e.g. pressing), compaction (e.g. repeated pressing in different spatial directions) and/or shredding of the empties. For example, the empties can be pressed and/or broken up (e.g. shredded or cut) individually, i.e. as individual bottles or cans, or in groups in order to reduce/distribute the dimensions and/or the weight of the empties for transport in the empties transport conduit. This can allow the conduit diameter to be made smaller and/or the airstream generator to be made weaker by comparison with the case of uncompacted empties. Moreover, the space present in the empties collection container can be better utilized by virtue of a higher packing density of the empties therein.

Moreover, in the empties return system, the empties compacter (or, for example, a further empties compacter) can be arranged between the empties admission opening of the reverse vending machine and the airlock device or between the second attachment point of the empties transport conduit and the empties collection container, such that only one individual empties compacter is needed for several reverse vending machines, which lowers costs and space requirements.

The airlock gate of the airlock device (which is designated in this case, for example, as a rotary lock) can be formed, for example, by a rotatable airlock chamber wall, which is opened radially to the rotation axis at one side and by which an airlock chamber is delimited (e.g. the airlock chamber wall forms a hollow cylinder, which is radially open at one side, with closed longitudinal ends), wherein the airlock chamber, by the radial opening, can be selectively connected, by rotation of the airlock chamber wall, to the empties transport conduit and to the reverse vending machine attached thereto. For this purpose, the airlock gate is designed in such a way that the radial opening of the airlock chamber wall cannot be connected simultaneously to the airlock chamber wall and to the empties transport conduit and the reverse vending machine.

A further possible embodiment of the airlock device can be in the manner of a drum of a revolver. For this purpose, for example, several chambers (e.g. two, three, four, five or more chambers) can be provided in a drum body rotatable about a rotation axis, which chambers are open in the direction of the rotation axis (axial direction) and are suitable for receiving the empties. In the axial direction, the drum body is delimited by two fixed plates and is rotatable relative to these (e.g. driven by an electric motor, which, for example, can be controlled selectively by the control device). The two plates each have a through-hole, which through-holes are at a distance from the rotation axis of the drum body and do not correspond to each other, i.e. at least substantially do not overlap. One of the holes is an insertion hole, through which the empties from the reverse vending machine can be inserted into one of the chambers, and the other hole is an output hole, through which the empties can be output from one of the chambers into the empties transport conduit. Consequently, by selective rotation of the drum body, one chamber can be moved respectively under the insertion hole, in order to receive empties, and can then be moved to the output hole, in order to output the empties. In this way, the effects described for the rotary lock are likewise attainable.

The empties transport system can have several second attachment points with an associated closure mechanism, which is connected to the control device, for attachment to mutually different empties collection containers, wherein the control device controls the respective closure mechanism in such a way that the empties can be transferred selectively from the empties transport conduit to one of the empties collection containers. For example, different batches of empties (e.g. plastic bottles or aluminum beverage cans) can be output into different collection containers, by virtue of the fact that only the empties collection container corresponding to the empties currently being transported in the empties transport conduit is connected to the empties transport conduit by an open closure mechanism.

Moreover, the control device can further be designed to control the airstream generator as a function of a demand signal, which, for example, is output from a sensor of the empties transport system, which sensor is arranged in the reverse vending machine and/or in the airlock device, such that the transporting airstream in the empties transport conduit is made available/takes effect only on demand. That is to say, the empties transport system can be operated cyclically for example (i.e. with breaks in operation). This keeps power consumption down and minimizes noise generation. A demand signal of this kind can, for example, be generated and transmitted to the control device when empties are introduced into the reverse vending machine through the empties admission opening or when the airlock device is filled to a certain degree with empties (e.g. uncompacted, compacted or compressed empties, etc.).

BRIEF DESCRIPTION OF THE DRAWINGS

Illustrative embodiments are shown in the figures and are explained in detail below.

DETAILED DESCRIPTION

In the following detailed description, reference is made to the accompanying drawings, which form part of said description, and which, for illustrative purposes, show specific embodiments. In this respect, use is made of directional terminology such as "up", "down", "forward", "rearward", "front", rear", etc., in relation to the orientation of the figure(s) described. Since components of embodiments can be positioned in a number of different orientations, the directional terminology serves for illustrative purposes and is in no way limiting. Of course, it is possible to use other embodiments and to implement structural or logical modifications without departing from the scope of the disclosure. It is of course possible for the features of the various illustrative embodiments described herein to be combined with one another, unless specifically stated otherwise. The following detailed description should therefore not be interpreted as being limiting.

Within the context of this description, the terms "connected", "attached", "coupled" and the like are used for describing direct and indirect connection, direct or indirect attachment, and direct or indirect coupling. In the figures, identical or similar elements are provided with identical reference signs, if this is deemed expedient.

Figure 1:
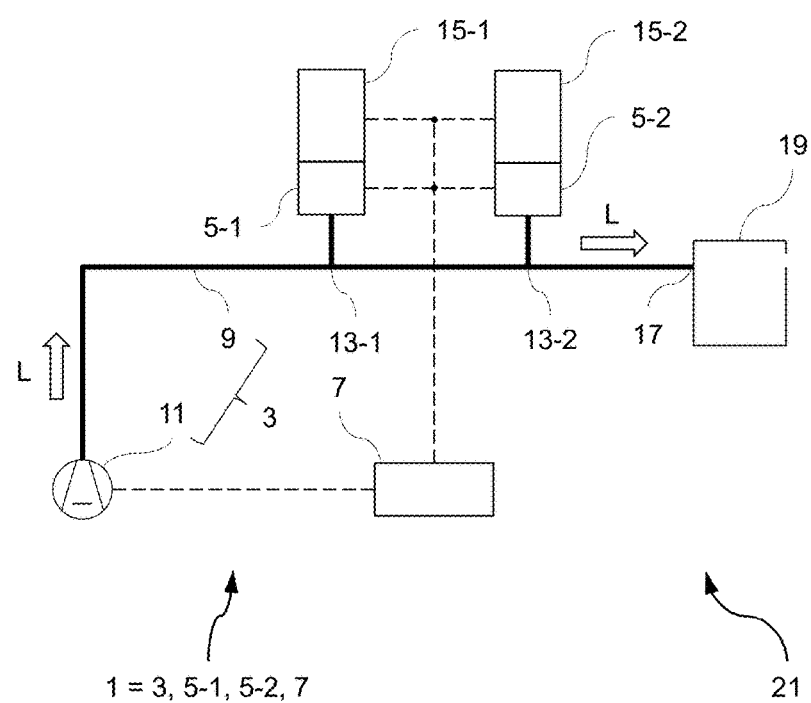
FIG. 1 shows a schematic empties transport system and a schematic empties return system according to one embodiment.

A schematic empties transport system 1 with an airstream transport device 3, two airlock devices 5-1 and 5-2 and an automatic control device 7 is shown in FIG. 1. The airstream transport device 3 is composed of an empties transport conduit 9 and of an airstream generator 11 and has two first attachment points 13-1 and 13-2 for the attachment (by the associated airlock device 5-1 or 5-2) of a respective reverse vending machine 15-1 and 15-2, and a second attachment point 17 for an empties collection container 19. All of the components shown in FIG. 1 together form an empties return system 21. For example, some components of the empties transport system, e.g. the airstream generator 11 and an empties compacter (described further below), can be arranged on a roof of the reverse vending facility.

The empties transport conduit 9 is a conduit in which an airstream L is generated by the airstream generator 11 and, at least starting from a location upstream from the two first attachment points 13-1 and 13-2, acts as far as the second attachment point 17. For this purpose, the airstream generator 11 is connected to one end of the empties transport conduit 9 located upstream from the two first attachment points 13-1 and 13-2. In this embodiment, the airstream generator 11 is a radial ventilator, which provides a volumetric flow in a range of approximately 150 m$^3$/h to approximately 350 m$^3$/h, for example in a range of approximately 200 m$^3$/h to approximately 300 m$^3$/h, for example of approximately 250 m$^3$/h. The empties transport conduit 9 can have a diameter in a range of approximately 5 cm to approximately 50 cm, for example in a range of approximately 10 cm to approximately 30 cm, for example in a range of approximately 15 cm to approximately 25 cm.

For the sake of clarity, the empties transport system 1 and the empties return system 21 are described below as having only a single reverse vending machine 15 attached thereto, a single airlock device 5 and a single first attachment point 13, although, as is evident from FIG. 1, two reverse vending machines 15-1 and 15-2 are attached to the empties transport system 1. Further embodiments with only one reverse vending machine or with more than two reverse vending machines, for example three, four, five, six, seven, eight or more reverse vending machines, are possible analogously. Moreover, in the description below, the term "empties" stands so to speak for an individual beverage container (e.g. an individual returnable bottle or beverage can), a group of beverage containers, or parts thereof (e.g. shreds/jointly compressed beverage containers), wherein the specific configuration of the empties will be clear from the context.

The airlock device 5 is connected to the empties transport conduit 9 at the first attachment point 13 in order to receive empties 31 from the reverse vending machine 15 (described in detail further below). The transfer of the empties 31 from the airlock device 5 to the empties transport conduit 9 is controlled by the control device 7, which is connected to the airstream generator 11, to the reverse vending machine 15 and to the airlock device 5. For control purposes, the control device 7 receives from the designated components, i.e. from sensors assigned to these, e.g. information concerning an operating state of the airstream generator 11, concerning the type of empties (for example bottle or can), or concerning the quantity of the empties, etc., and controls at least the airlock device 5 accordingly.

Figure 2:
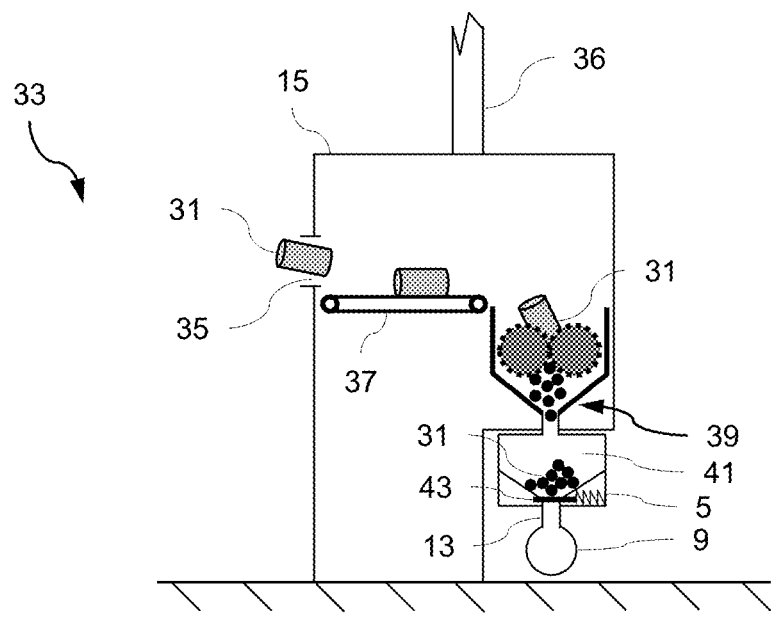
FIG. 2 shows an arrangement of a reverse vending machine, an empties compacter, an airlock device, and an empties transport conduit according to the embodiment shown in FIG. 1.

In FIG. 2, the reverse vending machine 15 and the airlock device 5 according to an illustrative embodiment are shown schematically in the area of the first attachment point 13. In the further description of the reverse vending machine 15, certain elements have been omitted, for example a detection device for the empties and a voucher dispenser of the reverse vending machine.

The reverse vending machine 15 is set up in a machine area 33 of a reverse vending facility (e.g. in a supermarket or beverage shop), and it is thus possible for consumers to introduce, and thus return, empties 31 into the reverse vending machine 15 on a front side of the reverse vending machine 15, through an empties admission opening 35 provided there. The reverse vending machine 15 is usually set up such that at least its rear side is separated spatially from the machine area 33, e.g. by a wall 36. The handling of the empties 31 takes place on the rear side of the reverse vending machine 15 (i.e. behind the wall 36), and therefore noise and odors caused by the handling of the empties are kept away from the machine area 33.

Moreover, the reverse vending machine 15 has a conveyor 37 and an empties compacter 39. The conveyor 37 is here a conveyor belt, which extends from the empties admission opening 35 to the empties compacter 39, which is integrated in a rear part of the reverse vending machine 15 (the empties compacter 39 can also be designed as a device separate from the reverse vending machine 15). The empties compacter 39 serves to compact the empties 31 delivered through the empties admission opening 35 by the conveyor 37. In this case, the empties compacter 39 is designed as a shredder by which the empties 31, i.e. individual beverage containers separately or several beverage containers jointly, are cut into shreds, e.g. in order to prevent blockage of the empties transport conduit 9. However, the empties compacter 39 can also be designed as a press, which only presses together (e.g. compresses/compacts) the empties 31, or it can be a combination of both.

The empties 31 shredded in the empties compacter 39 are here discharged at a rear, lower side (or other expedient side) of the reverse vending machine 15 and received by the airlock device 5. For this purpose, the airlock device 5 has an airlock chamber 41 formed therein, and an airlock gate 43, which, controlled by the control device 7, selectively separates the airlock chamber 41 from the empties transport conduit 9 or connects it to the latter. The airlock gate 43 is designed, for example, as a spring-loaded slide, which is opened by a pneumatic cylinder, or it is actuated (without spring) by an electric motor or other actuators (e.g. pneumatic actuators). Thus, the reverse vending machine 15 is likewise selectively separated or connected to the empties transport conduit 9 via the airlock chamber 41. When empties 31 (e.g. an individual shredded bottle or several shredded bottles) located in the airlock chamber 41 are to be transferred to the empties transport conduit 9, the control device 7 controls the airlock gate 43 to be opened for a defined period, such that the empties 31 are sucked into the empties transport conduit 9 by the airstream L present therein (e.g. also assisted by gravity). At the same time, odors in the reverse vending machine 15 are likewise carried off. To prevent excessive withdrawal of air from the reverse vending machine 15 (and/or from the machine area 33), the airlock device 5 can be equipped with a further airlock gate (not shown), which delimits the airlock chamber 41 toward the reverse vending machine 15, and which is (at least partially) closed when the other airlock gate 43 is opened.

The empties 31 introduced into the empties transport conduit 9 are carried along by the airstream L present therein and are transported to the empties collection container 19 (cf. FIG. 1). The diameter of the empties conduit is adapted to the empties 31, i.e. to the size and the shape of the empties 31, such that the empties 31 are able to move freely (in translation and in rotation) in the transporting airstream L in the empties transport conduit 9. Bends or curves, further (first and/or second) attachment points, branches, etc., in the empties transport conduit 9 are designed such that backing up and blockage of empties is prevented.

After the transport of the empties 31 in the empties transport conduit 9, the empties 31 (shreds) are introduced into the empties collection container 19 via the second attachment point 17. For this purpose, the empties collection container 19, at least substantially at an upper area thereof, is coupled to the empties transport conduit 9, such that the empties 31 are blown into the empties collection container 19 and remain there, while excess air of the transporting airstream L escapes from the empties collection container 19. In this way, the empties collection container 19 can be filled continuously with a high packing density.

Figure 3:
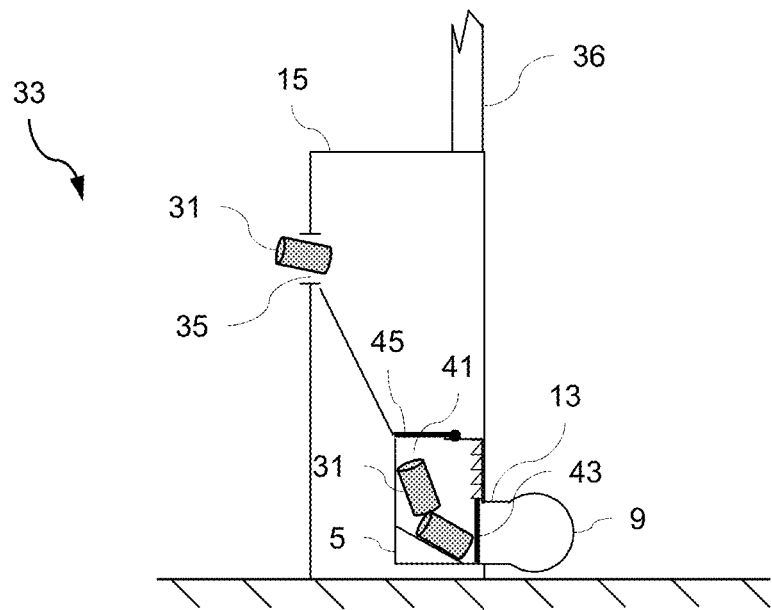
FIG. 3 shows a further arrangement of a reverse vending machine, an airlock device and an empties transport conduit according to the embodiment shown in FIG. 1.

In FIG. 3, the reverse vending machine 15 and the airlock device 5 according to a further illustrative embodiment are shown schematically in the area of the first attachment point 13. The empties transport system 1 and the empties return system 21 correspond basically to those of FIG. 1, although the empties transport conduit 9, on account of the adaptation to the size of the empties (see below), can have a greater diameter of the empties transport conduit, for example in a range of approximately 5 cm to approximately 50 cm, for example in a range of approximately 10 cm to approximately 30 cm, for example in a range of approximately 15 cm to approximately 25 cm (the empties transport conduit can, for example, also have different diameters, e.g. in a case where several empties transport conduits are run together).

The reverse vending machine 15 shown in FIG. 3 corresponds basically to the one shown in FIG. 2, but the reverse vending machine 15 of this embodiment has no conveyor and also no empties compacter. Here, the empties 31 are introduced by the consumer into the reverse vending machine 15 through the empties admission opening 35 and fall directly (uncompacted or unshredded) into the airlock device 5, which is arranged inside the reverse vending machine 15 at the lower rear thereof (although the airlock device 5 can also be designed as a device separate from the reverse vending machine 15). In this configuration of the reverse vending machine 15, the latter can, for example, have a simple and compact structure. Moreover, compared to the case where empties are compacted, the intact empties cause less residual liquid to escape, for example, which can reduce the build-up of odors. Notwithstanding this, an individual empties compacter can be arranged on the empties collection container 19 or anywhere along the course of the empties transport conduit 9, e.g. on the roof of the reverse vending facility, in order to compact the empties 31 directly on the empties collection container 19 or anywhere along the course of the empties transport conduit 9. Generally, the empties transport conduit 9 can run through, and interconnect, processing centers, e.g. areas with reverse vending machines, empties compacters, etc., and discharge areas, e.g. discharge devices to collection containers.

The airlock device 5 of the reverse vending machine 15 of this embodiment has an airlock chamber 41 formed therein, and a first airlock gate 43, which, controlled by the control device 7, selectively separates the airlock chamber 41 from the empties transport conduit 9 or connects it to the latter, and a second airlock gate 45, which, controlled by the control device 7, selectively connects the airlock chamber 41 to the reverse vending machine 15 (the empties admission opening 35). When empties 31 (e.g. one or more beverage cans) located in the airlock chamber 41 are transferred to the empties transport conduit 9, the control device 7 controls the airlock gate 43 to be opened for a defined period, such that the empties 31 are sucked into the empties transport conduit 9 by the airstream L present therein. At the same time, the control device 7 controls the second airlock gate 45 to be (at least substantially) closed, such that there is no excessive suction of air from the reverse vending machine 15 and/or from the machine area 33.

What is claimed is:

1. An empties transport system for automatic transport of empties from a reverse vending machine to an empties collection container, with:
    an airstream transport device, including:
        an empties transport conduit having a first attachment point for attachment to the reverse vending machine and a second attachment point for attachment to the empties collection container, and
        an airstream generator, which is attached to the empties transport conduit and is designed to make available, in the empties transport conduit, a transporting airstream by means of which the empties passing via the first attachment point from the reverse vending machine into the empties transport conduit are movable to the empties collection container,
    an airlock device arranged on the first attachment point of the reverse vending machine and attachable between the reverse vending machine and the empties transport conduit, and via which the empties are transferable from the reverse vending machine to the empties transport conduit, and which has at least one airlock gate for automatically controlled, selective separation of the empties transport conduit from the reverse vending machine, and
    an automatic control device which is connected to the airlock device in order to automatically control an opening and closing actuation of the at least one airlock gate as a function of the empties which are to be carried away via the empties transport conduit and which are delivered to the airlock device from the reverse vending machine.

2. The empties transport system as claimed in claim 1, wherein the airstream generator, during the operation of the empties transport system, makes the transporting airstream permanently available.

3. The empties transport system as claimed in claim 2, wherein the airlock device has a second airlock gate, and wherein the control device is designed to control the opening and closing actuation of the first and the second airlock gate of the airlock device in such a way that at least substantially only one of the first and the second airlock gates is opened.

4. The empties transport system as claimed in claim 1, wherein the airlock device and/or the first attachment point are/is designed in such a way that the transfer of the empties from the airlock device to the empties transport conduit is effected at least substantially exclusively by an air flow underpressure which is generated in the empties transport conduit and acts on the empties present in the airlock device.

5. The empties transport system as claimed in claim 1, wherein the empties transport conduit has a conduit diameter which is greater than the greatest dimension of the empties, such that the empties in the empties transport conduit are freely movable at least substantially in all directions.

6. An empties return system, comprising:
    a reverse vending machine including,
        an empties admission opening in a front side of the reverse vending machine through which empties can be introduced into the reverse vending machine,
        a first attachment point on the rear side of the vending machine including an opening,
    an empties collection container including a second attachment point, and a transport system for automatic transport of empties from the reverse vending machine to the empties collection container, comprising:

an airstream transport device, including:

an empties transport conduit having at least a first attachment point for attachment to the first attachment point of the reverse vending machine and at least a second attachment point for attachment to the second attachment point of the empties collection container, an airstream generator, which is attached to the empties transport conduit and is designed to make available, in the empties transport conduit, a transporting airstream by means of which the empties passing via the first attachment point from the reverse vending machine into the empties transport conduit are movable to the empties collection container, an airlock device arranged on the first attachment point of the reverse vending machine and attachable between the reverse vending machine and the empties transport conduit, and via which the empties are transferable from the reverse vending machine to the empties transport conduit, and which has at least one airlock gate for automatically controlled, selective separation of the empties transport conduit from the reverse vending machine, and an automatic control device which is connected to the airlock device in order to automatically control an opening and closing actuation of the at least one airlock gate as a function of the empties which are to be carried away via the empties transport conduit and which are delivered to the airlock device from the reverse vending machine.

7. The empties return system as claimed in claim 6, wherein the airlock device is arranged at a distance from the empties admission opening, and wherein the reverse vending machine has a conveyor device which is arranged between the empties admission opening and the airlock device, via which the empties introduced into the reverse vending machine through the empties admission opening can be conveyed automatically to the airlock device.

8. The empties return system as claimed in claim 6, wherein the airlock device is arranged adjacent to the empties admission opening, wherein empties introduced through the empties admission opening transfer directly into the airlock device and get sucked into the empties transport conduit by means of the airflow underpressure.

9. The empties return system as claimed in any of claims 6 through 8, wherein several reverse vending machines are connected to the empties transport conduit by means of a respective first attachment point in the reverse vending machine.

10. The empties return system as claimed in any of claims 6 through 8, further having an empties compacter by which the empties delivered to the reverse vending machine are compacted by compression and/or shredding.

11. The empties return system as claimed in claim 10, wherein the empties compacter is arranged between the empties admission opening of the reverse vending machine and the airlock device or is arranged between the second attachment point of the empties transport conduit and the empties collection container.

* * * * *